US012115856B2

(12) United States Patent
Oe et al.

(10) Patent No.: US 12,115,856 B2
(45) Date of Patent: *Oct. 15, 2024

(54) IN-VEHICLE TERMINAL DEVICE AND DISPLAY METHOD FOR IN-VEHICLE DISPLAY

(71) Applicant: TOYOTA JIDOSHA KABUSHIKI KAISHA, Toyota (JP)

(72) Inventors: Yoshihiro Oe, Kawasaki (JP); Kazuya Nishimura, Okazaki (JP); Jun Goto, Toyota (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,588

(22) Filed: Aug. 31, 2023

(65) Prior Publication Data

US 2023/0406105 A1 Dec. 21, 2023

Related U.S. Application Data

(63) Continuation of application No. 16/817,779, filed on Mar. 13, 2020, now Pat. No. 11,807,097.

(30) Foreign Application Priority Data

Mar. 28, 2019 (JP) ................................ 2019-064899

(51) Int. Cl.
*B60K 35/60* (2024.01)
*B60K 35/00* (2024.01)
(Continued)

(52) U.S. Cl.
CPC ............ *B60K 35/60* (2024.01); *B60N 2/0248* (2013.01); *G06F 21/31* (2013.01); *G06V 20/59* (2022.01);
(Continued)

(58) Field of Classification Search
CPC ........ B60K 35/60; B60K 35/22; B60K 35/29; B60K 35/53; B60K 35/81; B60K 35/85;
(Continued)

(56) References Cited

U.S. PATENT DOCUMENTS 9,469,195 B1* 10/2016 Boss ...................... B60K 35/00
2019/0196851 A1* 6/2019 Penilla ............... G06Q 30/0226
(Continued)

FOREIGN PATENT DOCUMENTS

| JP | 2005-67406 A | 3/2005 |
| JP | 2007-522981 A | 8/2007 |

(Continued)

OTHER PUBLICATIONS

May 18, 2022 Office Action issued in U.S. Appl. No. 16/817,779.

(Continued)

*Primary Examiner* — Douglas M Wilson
(74) *Attorney, Agent, or Firm* — Oliff PLC (57) ABSTRACT

In an in-vehicle terminal device that is able to perform communication with a server device, an identification information acquisition unit acquires identification information of a user who boards a vehicle. A communication unit transmits the identification information of the user to the server device and receives arrangement information of a plurality of display elements corresponding to the identification information of the user transmitted from the server device. A setting unit decides an arrangement of the display elements of the in-vehicle display according to an arrangement criterion based on vehicle type information of the vehicle using the arrangement information of the display elements corresponding to the identification information of the user.

5 Claims, 5 Drawing Sheets

(51) Int. Cl.
*B60K 35/10* (2024.01)
*B60K 35/22* (2024.01)
*B60K 35/29* (2024.01)
*B60K 35/65* (2024.01)
*B60K 35/81* (2024.01)
*B60K 35/85* (2024.01)
*B60N 2/02* (2006.01)
*G06F 21/31* (2013.01)
*G06V 20/59* (2022.01)
*B60K 35/53* (2024.01)

(52) U.S. Cl.
CPC .............. *B60K 35/00* (2013.01); *B60K 35/10* (2024.01); *B60K 35/22* (2024.01); *B60K 35/29* (2024.01); *B60K 35/53* (2024.01); *B60K 35/65* (2024.01); *B60K 35/81* (2024.01); *B60K 35/85* (2024.01); *B60K 2360/182* (2024.01); *B60K 2360/1868* (2024.01); *B60K 2360/592* (2024.01); *B60K 2360/741* (2024.01)

(58) Field of Classification Search
CPC ........ B60K 2360/182; B60K 2360/592; B60K 35/65; B60K 2360/122; B60K 2360/1868; B60K 2360/741; B60K 35/10; B60K 35/00; B60N 2/0248; G06F 21/31; G06V 20/59; B60R 16/02; B60R 11/0229; B60R 2011/0005

See application file for complete search history.

(56) References Cited

U.S. PATENT DOCUMENTS

2019/0279447 A1* 9/2019 Ricci .................... B60N 2/0022
2019/0288916 A1   9/2019 Ricci

FOREIGN PATENT DOCUMENTS

| JP | 2008-123466 A | 5/2008 |
| JP | 2014-8818 A | 1/2014 |
| JP | 2014-113831 A | 6/2014 |
| JP | 2018-154240 A | 10/2018 |
| WO | 2005/080120 A1 | 9/2005 |

OTHER PUBLICATIONS

Sep. 9, 2022 Office Action issued in U.S. Appl. No. 16/817,779.
Jan. 23, 2023 Office Action issued in U.S. Appl. No. 16/817,779.
Jun. 30, 2023 Notice of Allowance issued in U.S. Appl. No. 16/817,779.

* cited by examiner

| USER ID | DISPLAY ELEMENT ID | DISPLAY ELEMENT ID | ... |

FIG. 4B

| DISPLAY ELEMENT ID | REGION INFORMATION | POSITIONAL INFORMATION | SIZE | PRIORITY | NON-DISPLAY PROHIBITION |

IN-VEHICLE TERMINAL DEVICE AND DISPLAY METHOD FOR IN-VEHICLE DISPLAY

INCORPORATION BY REFERENCE

This application is a continuation of U.S. application Ser. No. 16/817,779 filed Mar. 13, 2020, which claims the benefit of Japanese Patent Application No. 2019-064899 filed on Mar. 28, 2019 including the specification, drawings and abstract is incorporated herein by reference in its entirety.

BACKGROUND

1. Technical Field

The present disclosure relates to a technique for arranging display elements of an in-vehicle display.

2. Description of Related Art

Japanese Unexamined Patent Application Publication No. 2014-113831 (JP 2014-113831 A) discloses an information providing device for a vehicle capable of customizing meter display according to a user's preference. The information providing device for a vehicle can set a meter to display or non-display and can change a display position of the meter.

SUMMARY

In a technique disclosed in JP 2014-113831 A, in a case where a user boards a vehicle different from a vehicle, in which meter display is customized, the user performs customization setting of meter display again.

The disclosure provides a technique for allowing a user to save labor for setting a plurality of display elements displayed on an in-vehicle display when the user boards another vehicle.

A first aspect of the disclosure relates to an in-vehicle terminal device that is able to perform communication with a server device. The in-vehicle terminal device includes an identification information acquisition unit, a communication unit, and a setting unit. The identification information acquisition unit is configured to acquire identification information of a user who boards a vehicle. The communication unit is configured to transmit the identification information of the user to the server device and receive arrangement information of a plurality of display elements of an in-vehicle display corresponding to the identification information of the user transmitted from the server device. The setting unit is configured to decide an arrangement of the display elements of the in-vehicle display according to an arrangement criterion based on vehicle type information of the vehicle using the arrangement information of the display elements corresponding to the identification information of the user.

A second aspect of the disclosure relates to a display method for an in-vehicle display. The method includes a step of acquiring identification information of a user who boards a vehicle, a step of transmitting the identification information of the user to a server device, a step of receiving arrangement information of a plurality of display elements of the in-vehicle display corresponding to the identification information of the user transmitted from the server device, and a step of deciding an arrangement of the display elements of the in-vehicle display according to an arrangement criterion based on vehicle type information of the vehicle using the arrangement information of the display elements corresponding to the identification information of the user.

According to the disclosure, it is possible to provide a technique for allowing a user to save labor for setting a plurality of display elements displayed on the in-vehicle display when the user boards another vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
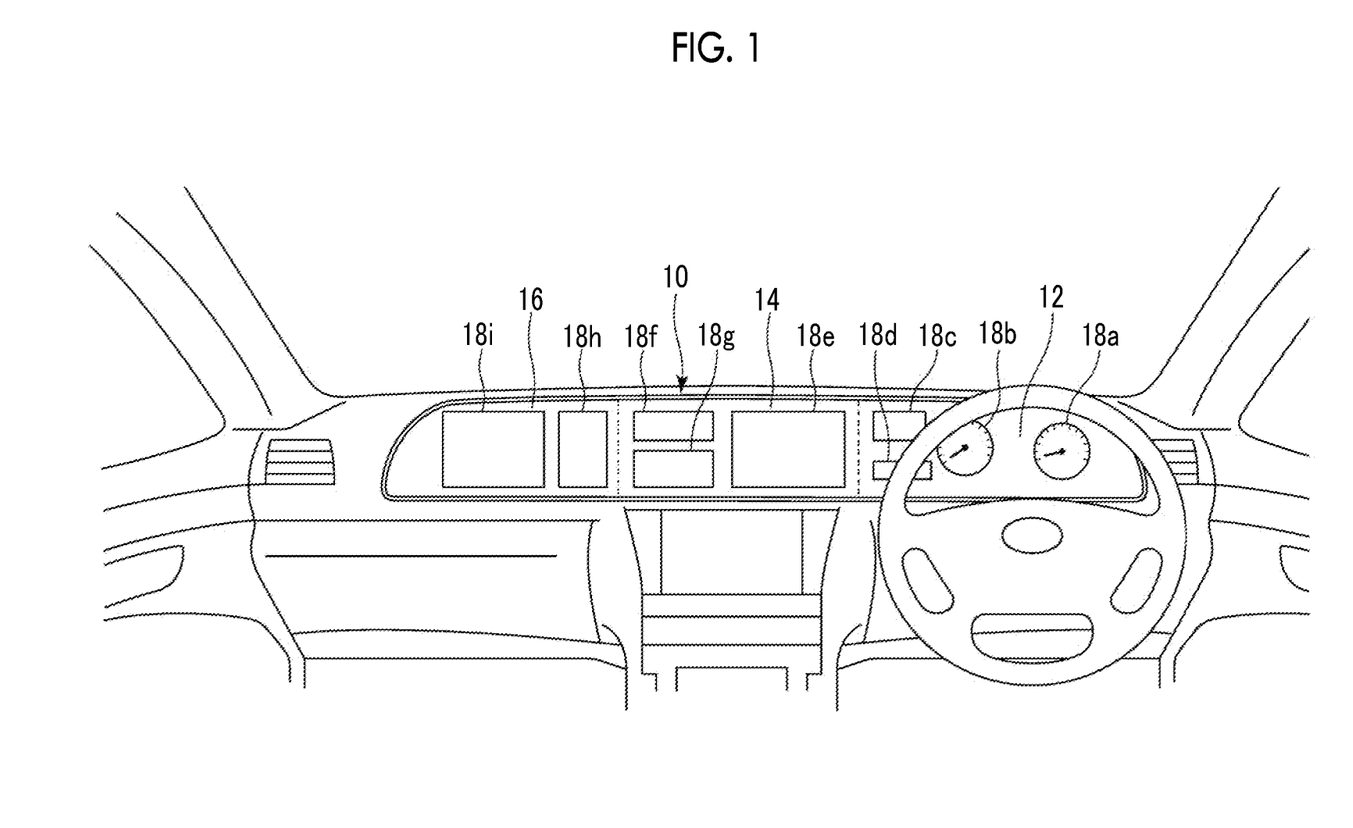
FIG. 1 is a diagram showing a display in a vehicle.

FIG. 1 shows a display 10 in a vehicle. The display 10 is provided in a dashboard, extends in a vehicle right-left direction, and is arranged over the front of a driver's seat and the front of an assistant driver's seat. The display 10 is divided into a drivers seat side region 12 positioned in front of the driver's seat, a first assistant driver's seat side region 14 positioned on the assistant driver's seat side from the driver's seat side region 12, and a second assistant driver's seat side region 16 positioned on the assistant driver's seat side from the first assistant driver's seat side region 14.

In FIG. 1, although the driver's seat side region 12, the first assistant driver's seat side region 14, and the second assistant driver's seat side region 16 are continued to form the display 10, the driver's seat side region 12, the first assistant driver's seat side region 14, and the second assistant driver's seat side region 16 may constitute the display 10 as separate bodies.

On the display 10, a plurality of display elements 18a, 18b, 18c, 18d, 18e, 18f, 18g, 18h, 18i (in a case where there is no need for distinction, referred to as "display elements 18") are displayed. The display elements 18 are a speedometer, a tachometer, a fuel meter, a distance meter, a tire pressure meter, a menu screen, a navigation screen, a front camera screen, a sideview mirror camera screen, a television screen, an audio screen, a telephone screen, and the like, and display various kinds of information.

The display elements 18 may be changed in size or position according to a user's input or may be replaced with other display elements 18. As the display elements 18 of the display 10 are made to be customized, it is possible to provide function display conforming to a user's preference or usage.

Figure 2:
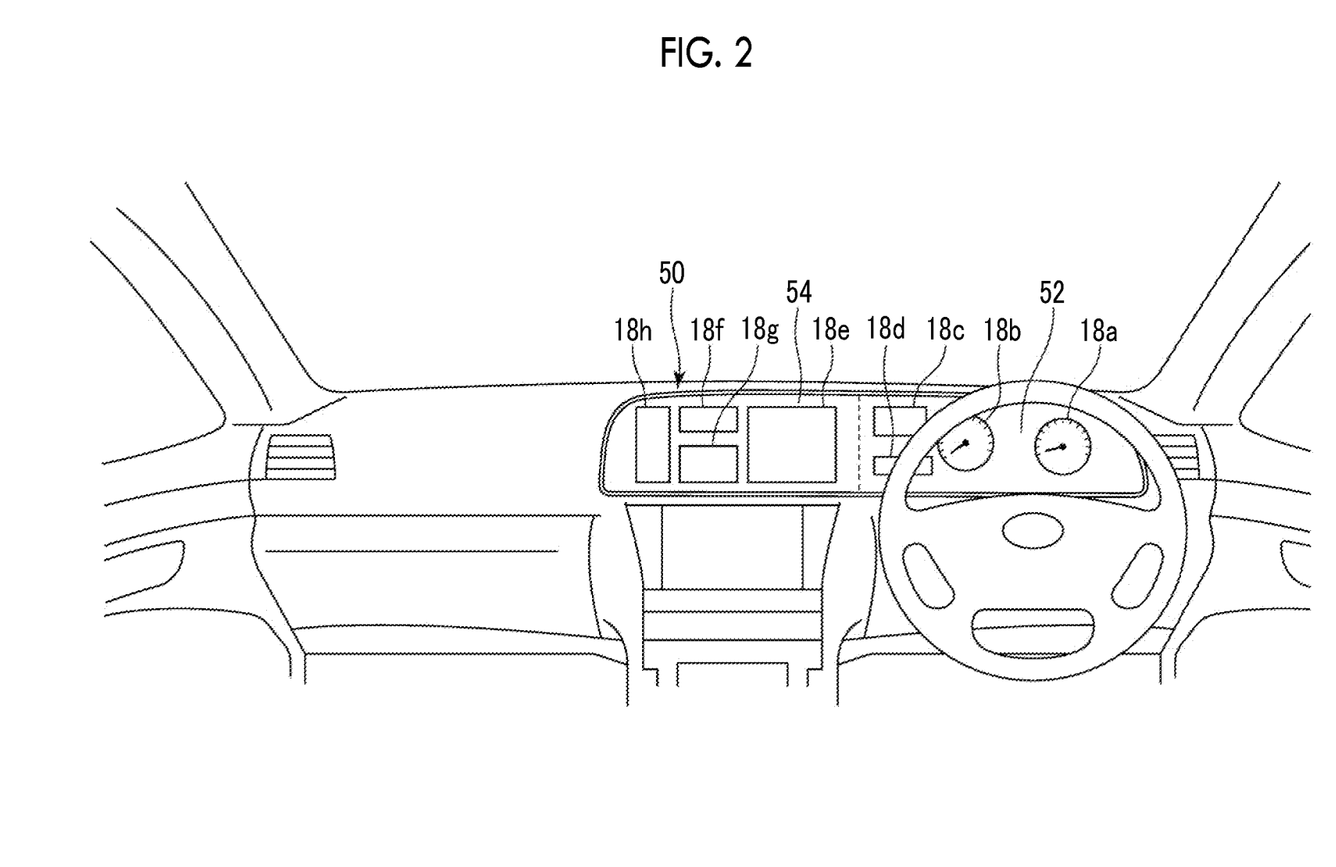
FIG. 2 is a diagram showing a display different from the display shown in FIG. 1.

FIG. 2 shows a display 50 different from the display 10 shown in FIG. 1. The display 50 shown in FIG. 2 is mounted in a vehicle of a vehicle type different from the display 10 shown in FIG. 1. Thus, the display 50 has a size and a shape different from the display 10. The display 50 has a shape in which the second assistant driver's seat side region 16 shown in FIG. 1 is not provided.

The display 50 has a driver's seat side region 52 and an assistant driver's seat side region 54 positioned on the assistant driver's seat side from the driver's seat side region 52. The driver's seat side region 52 and the assistant driver's seat side region 54 may be continued and provided as a single body or may be separate bodies.

A display system of an embodiment can also apply the arrangement of the display elements 18 customized by the user to a display 50 of another vehicle. As shown in FIGS. 1 and 2, since the shape or size of the display 10 or 50 is different depending on the vehicle type, the display system decides the arrangement of the display elements 18 according to an arrangement criterion based on the vehicle type. With this, in a case where another driver changes the arrangement of the display elements 18, in a case where another driver boards a shared car or a rental car, or the like, it is possible to set the arrangement of the display elements 18 suitable for the user, and to save labor of the user.

Figure 3:
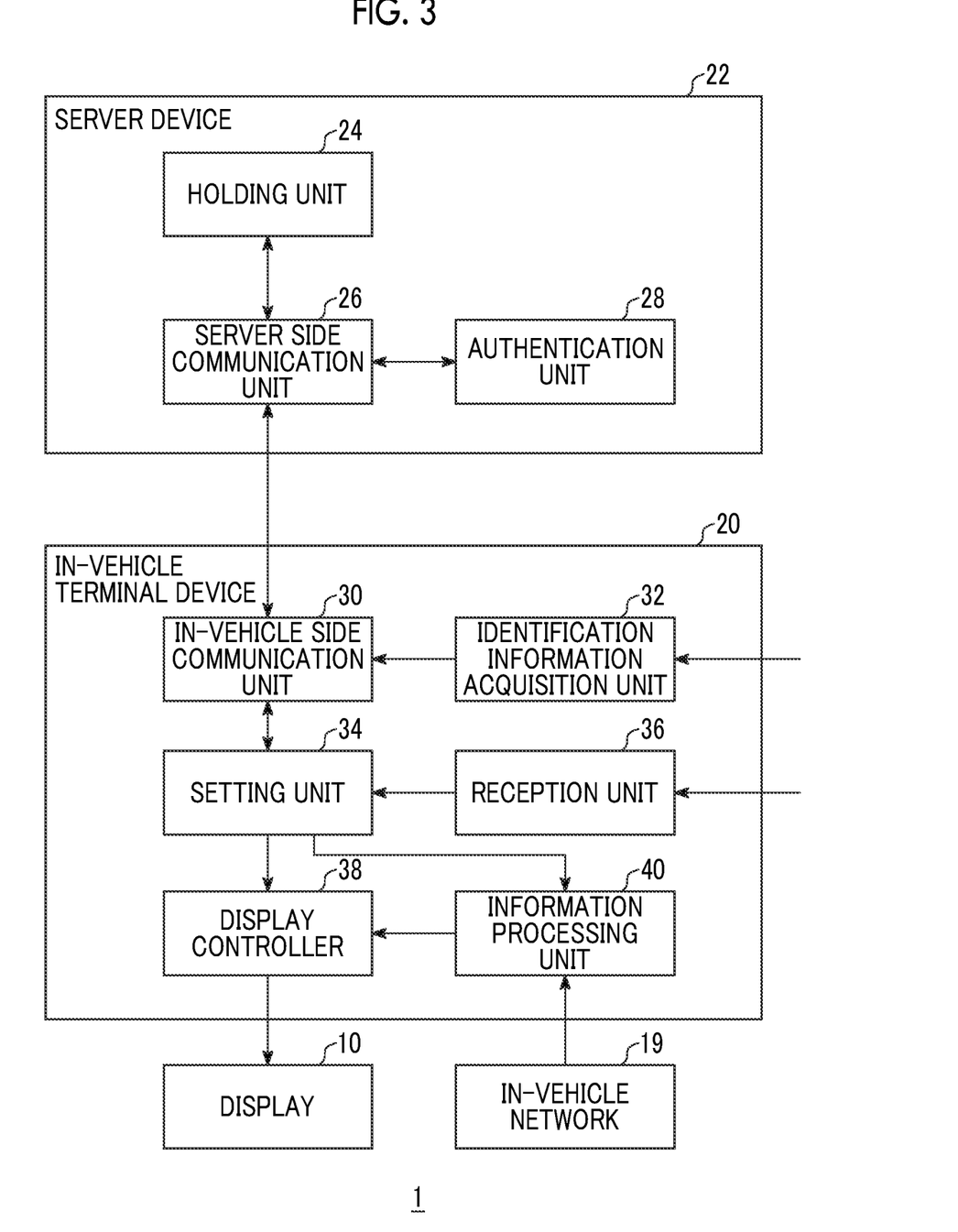
FIG. 3 is a diagram showing the functional configuration of a display system.

FIG. 3 shows the functional configuration of a display system 1. In FIG. 3, elements that are described as functional blocks for executing various kinds of processing can be constituted of a circuit block, a memory, and other LSIs in terms of hardware or are implemented by a program or the like loaded in a memory in terms of software. Accordingly, it can be understood by those skilled in the art that the functional blocks can be implemented in various forms by hardware solely, software solely, or a combination of hardware and software, and are not limited to either one.

The display system 1 includes the display 10, an in-vehicle terminal device 20, and a server device 22. The in-vehicle terminal device 20 has an in-vehicle side communication unit 30, an identification information acquisition unit 32, a setting unit 34, a reception unit 36, a display controller 38, and an information processing unit 40. The server device 22 has a holding unit 24, a server side communication unit 26, and an authentication unit 28.

The server side communication unit 26 of the server device 22 transmits information to the in-vehicle side communication unit 30 and receives information from the in-vehicle side communication unit 30. The authentication unit 28 executes authentication for identifying a user. The authentication unit 28 holds identification information for identifying the user in advance. The identification information of the user may be a password or physical information of the user. In a case where a driver at the time of previous ignition-off and a present driver are identical, since the display of the display 10 may be performed as the previous setting, the server side communication unit 26 may not transmit the arrangement information of the display elements 18 and may transmit information for instructing to maintain the setting to the in-vehicle terminal device 20.

Figure 4A:
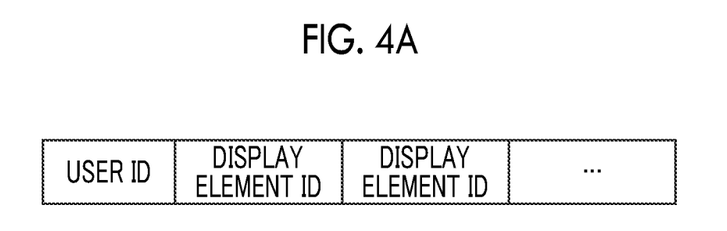
FIG. 4A is a diagram showing arrangement information of a plurality of display elements.
Figure 4B:
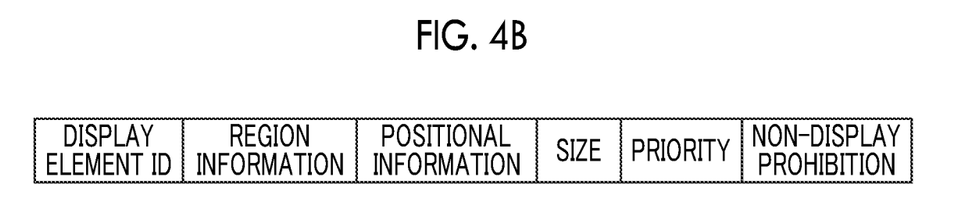
FIG. 4B is a diagram showing the arrangement information of the display elements.

The holding unit 24 holds the arrangement information of the display elements 18 corresponding to the identification information of the user. FIGS. 4A and 4B show the arrangement information of the display elements 18. FIG. 4A shows display element IDs associated with a user ID, and the display element IDs are decided to be displayed on the display 10 by the user.

FIG. 4B shows information of the display elements 18 displayed on the display 10. The holding unit 24 holds region information, positional information, size, priority, and information indicating non-display prohibition in association with the display element ID.

The region information indicates in which of the driver's seat side region 12, the first assistant driver's seat side region 14, and the second assistant driver's seat side region 16 the display element 18 is arranged. The region information includes information indicating a region where the display element 18 can be displayed. For example, information indicating the display element 18 that can be displayed solely in the driver's seat side region 12, the display element 18 that can be displayed in the first assistant driver's seat side region 14 and the second assistant driver's seat side region 16, and the like are included in the region information. The positional information indicates a position of the display element 18 on the display 10 using coordinates. The size indicates the size of the display element 18 on the display 10, and indicates a proportion of the display element 18 in the display 10.

The priority indicates priority of displaying the display element 18. For example, in a case where the display elements 18 are arranged from the display 10 shown in FIG. 1 to the display 50 shown in FIG. 2, any display element 18 may not be displayed. In such a case, decision is made by the setting unit 34 whether or not the display element 18 is brought into non-display based on the priority. The priority is derived based on the position or use frequency of the display element 18. For example, as the position of the display element 18 is closer to the driver's seat, the priority is set to be higher and is derived that the display element 18 is important. The priority may be used for size adjustment of the display element 18. For example, as the priority is lower, the display element 18 may be displayed to be smaller.

In a case where information indicating non-display prohibition is in a state of flag on, the display element 18 is prohibited from being brought into non-display on the display 10, and in a case where information indicating non-display prohibition is in a state of flag off, the display element 18 can be brought into non-display on the display 10.

In the arrangement information, vehicle type information of a vehicle in which the setting of the arrangement information is executed may be included. Information indicating update date and time may be included in the arrangement information, and arrangement information of new update date and time may be provided to the in-vehicle terminal device 20.

Returning to FIG. 3, description will be continued. The identification information acquisition unit 32 of the in-vehicle terminal device 20 acquires identification information for identifying a user who boards the vehicle, for example, a driver. The identification information may be a code input by the user, a code transmitted from a portable terminal of the user, physical information of the user detected by a camera or a laser sensor, or the like.

The in-vehicle side communication unit 30 transmits and receives information to and from the server side communication unit 26 and attaches a vehicle ID to information at the time of transmission. In a case where an in-vehicle power supply is turned on, the in-vehicle side communication unit 30 transmits the identification information of the user to the server device 22 and receives the arrangement information of the display elements 18 corresponding to the identification information of the user transmitted from the server device 22. In a case where an ignition switch is turned off, the in-vehicle side communication unit 30 transmits the arrangement information of the display elements 18 set on the display 10 to the server side communication unit 26 and holds the arrangement information on the server device 22 side.

The reception unit 36 receives a user's input indicating into which of display and non-display any display element 18 of the display elements 18 is brought. The user can select the display elements to be displayed among the display elements 18 and can set the position and the size of each of the selected display elements 18. The user can also set analog display or digital display of numerical values of the display elements 18. In a case where the user's input is received, the reception unit 36 transmits an input result to the setting unit 34.

The information processing unit 40 acquires information for use in the display elements 18, for example, vehicle speed information, fuel information, and the like from the in-vehicle network 19. In the in-vehicle network 19, information detected by various in-vehicle sensors flows. The information processing unit 40 acquires information for use in the display elements 18 set by the setting unit 34 from the in-vehicle network 19, generates displayable data, for example, a speedometer or a tachometer based on a detection result, and transmits the generated data to the display controller 38.

The setting unit 34 decides the arrangement of the display elements 18 of the display 10 according to an arrangement criterion based on the vehicle type information of the vehicle using the arrangement information of the display elements 18 corresponding to the identification information of the user. The arrangement criterion is used for adjustment of the position or size of the display element 18 in arranging the display element 18 on a different display, and is determined, for example, based on the size and the shape of the display 10. With this, when the user boards a rental car, user's preferred display of the display can be implemented even though the user does not input the arrangement of the display elements 18 of the display.

The arrangement criterion based on the vehicle type information may be held in the in-vehicle terminal device 20 or may be held in the server device 22. The arrangement criterion based on the vehicle type information may be held for each different vehicle type or may be determined based on a difference in size or shape from a display of a different vehicle type. The arrangement criterion based on the vehicle type information may include a conversion table for adjusting the size of the display element 18 according to the difference in size of the display 10. The arrangement criterion based on the vehicle type information may determine the number of displayable display elements 18.

The setting unit 34 may store the arrangement information of the display elements 18 set by the user, and in a case where the same user boards the vehicle again, may decide the arrangement of the display elements 18 based on the stored arrangement information.

The setting unit 34 sets the position and the size of each of the display elements 18 according to the size of the display 10. For example, the setting unit 34 adjusts the position and the size of each of the display elements 18 according to an area and an aspect ratio of the display 10.

The setting unit 34 prohibits any display element 18 of the display elements 18 from being brought into non-display. For example, the display element 18 of the speedometer or the fuel meter is prohibited from being brought into non-display. With this, it is possible to prohibit information important for vehicle traveling from being excluded from the display 10.

The setting unit 34 may bring the display element 18, which has been decided to be displayed in the arrangement information held in the holding unit 24, into non-display based on the priority of the display element 18. For example, in a case where the display elements 18 are arranged from the display 10 shown in FIG. 1 to the display 50 shown in FIG. 2, any of the display elements 18 displayed in the first assistant driver's seat side region 14 and the second assistant driver's seat side region 16 is brought into non-display. In FIG. 2, the display element 18i shown in FIG. 1 is brought into to non-display. In a case where the number of display elements 18 shown in the arrangement information exceeds the number of displayable display elements 18 determined in the arrangement criterion based on the vehicle type information, the setting unit 34 selects the display elements 18 shown in the arrangement information based on the priority of each display element 18. With this, it is possible to cope with a case the size or the shape of the display is significantly different.

Arrangement change of any of the display elements 18 from the driver's seat side region 12 to the first assistant driver's seat side region 14 and the second assistant drivees seat side region 16 is restricted. For example, the speedometer and the fuel meter are displayed solely in the driver's seat side region 12. Information indicating restriction to arrangement change may be defined in the region information held in the holding unit 24 or may be held in the reception unit 36 in advance. Alternatively, arrangement change of any of the display elements 18 from the first assistant driver's seat side region 14 and the second assistant driver's seat side region 16 to the driver's seat side region 12 may be restricted. For example, the setting unit 34 cannot set such that a display element 18 for displaying a television image is displayed in the driver's seat side region 12. In this way, it is possible to separate information needed for driving and information to be enjoyed in the assistant driver's seat at appropriate positions.

The display controller 38 acquires information relating to the arrangement of the display elements 18 from the setting unit 34, acquires the display elements 18 generated by the information processing unit 40, and makes the display 10 display the display elements 18. In information relating to the arrangement of the display elements 18 acquired from the setting unit 34, the size or the position of each of the display elements 18 is determined.

Figure 5:
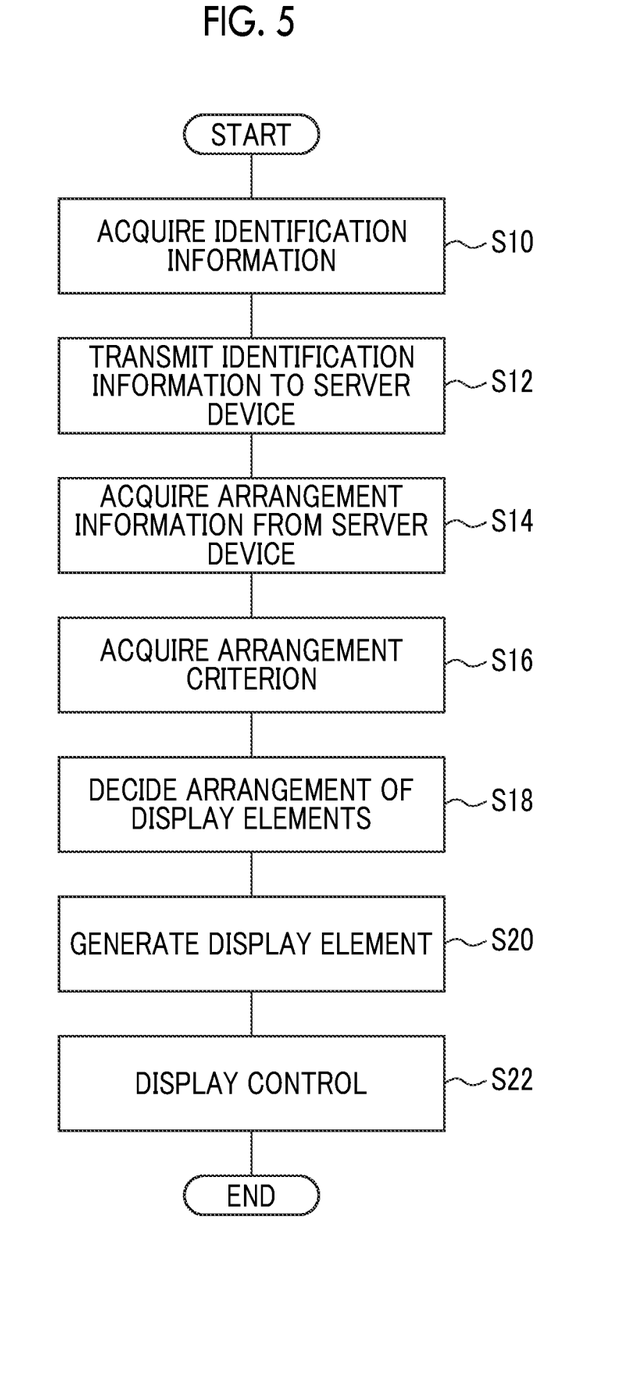
FIG. 5 is a flowchart of processing for making the display the display elements.

FIG. 5 is a flowchart of processing for making the display 10 display the display elements 18. The identification information acquisition unit 32 acquires the identification information of the user who boards the vehicle (S10), and the in-vehicle side communication unit 30 transmits the identification information of the user to the server device 22 (S12).

The server side communication unit 26 transmits the arrangement information corresponding to the identification information of the user among a plurality of pieces of arrangement information held in the holding unit 24 to the in-vehicle terminal device 20, and the setting unit 34 acquires the arrangement information (S14). The setting unit 34 acquires the arrangement criterion based on the vehicle type information of the vehicle that is boarded by the user (S16).

The setting unit 34 decides the arrangement of the display elements 18 of the display 10 according to the arrangement information corresponding to the identification information of the user and the arrangement criterion based on the vehicle type information (S18). The information processing unit 40 generates the display elements 18 based on information acquired from the in-vehicle network 19 and a decision result of the setting unit 34 (S20). The display controller 38 arranges the display elements 18 generated by the information processing unit 40 according to the decision result of the setting unit 34 and makes the display 10 display the display elements 18 (S22).

The embodiment is just illustrative, and it can be understood by those skilled in the art that various modification examples to a combination of the components may be made and such modification examples also fall within the scope of the disclosure.

What is claimed is:

1. A vehicle comprising:

an in-vehicle display; and an in-vehicle terminal device that is able to perform communication with a server device, the in-vehicle terminal device including:

an identification information acquisition unit configured to acquire identification information of a user who boards the vehicle;

a communication unit configured to transmit the identification information of the user to the server device and receive arrangement information of a plurality of display elements of the in-vehicle display corresponding to the identification information of the user transmitted from the server device; and a setting unit configured to decide an arrangement of the display elements of the in-vehicle display according to an arrangement criterion based on vehicle type information of the vehicle using the arrangement information of the display elements corresponding to the identification information of the user, wherein the vehicle type information indicates a particular vehicle out of a plurality of vehicles that each have a different shape or size for the in-vehicle display that displays the display elements, wherein the setting unit does not display at least one display element of the display elements when a shape and size of a display for a first particular vehicle is smaller than a shape and size of a display for a second particular vehicle, and wherein when a number of display elements shown in the arrangement information exceeds a number of displayable display elements determined in the arrangement criterion based on the vehicle type information, the setting unit selects the display elements shown in the arrangement information based on a priority of each display element.

2. The vehicle according to claim 1, wherein the setting unit is configured to set a position and a size of each display element according to a size of the in-vehicle display.

3. The vehicle according to claim 1, further comprising a reception unit configured to receive an input of the user indicating into which of display and non-display any display element of the display elements is brought, wherein the setting unit prohibits any display element of the display elements from being brought into non-display.

4. The vehicle according to claim 1, wherein:

the in-vehicle display has a driver's seat side region positioned in front of a driver's seat and an assistant driver's seat side region positioned on an assistant driver's seat side from the driver's seat side region; and arrangement change of any of the display elements from the driver's seat side region to the assistant driver's seat side region is restricted.

5. The vehicle according to claim 1, wherein:

the in-vehicle display has a driver's seat side region positioned in front of a driver's seat and an assistant driver's seat side region positioned on an assistant driver's seat side from the driver's seat side region; and the at least one display element of the display elements that is not displayed when the shape and size of the display for the first particular vehicle is smaller than the shape and size of the display for the second particular vehicle is from the assistant driver's seat side region.

* * * * *